United States Patent [19]

Armstrong et al.

[11] 4,422,990
[45] Dec. 27, 1983

[54] METHOD AND APPARATUS FOR MAKING SOIL PLUGS

[75] Inventors: Errol C. Armstrong, Mountain View; William A. Hanacek, Salinas, both of Calif.; Paul F. Hermann, Booth Harbor; Thorburn S. Kennedy, East Booth Bay, both of Me.

[73] Assignee: Castle & Cooke Techniculture, Inc., Salinas, Calif.

[21] Appl. No.: 364,578

[22] Filed: Apr. 1, 1982

[51] Int. Cl.³ ............................................. B29D 27/04
[52] U.S. Cl. .................................. 264/45.3; 47/74; 47/DIG. 7; 264/39; 264/334; 264/338; 425/93; 425/259; 425/261; 425/438; 425/817 R
[58] Field of Search ...................... 264/45.3, 46.5, 39, 264/334, 338; 425/817 R, 259, 261, 438, 93; 47/74, DIG. 7

[56] References Cited

U.S. PATENT DOCUMENTS

| | | | |
|---|---|---|---|
| 3,090,078 | 5/1963 | Ackles | 264/46.5 |
| 3,410,931 | 11/1968 | Johnson | 264/45.3 X |
| 4,034,508 | 7/1977 | Dedolph | |
| 4,221,749 | 9/1980 | Dedolph | 264/45.3 |
| 4,278,625 | 7/1981 | Dedolph | 264/45.3 X |

Primary Examiner—Philip E. Anderson
Attorney, Agent, or Firm—Townsend and Townsend

[57] ABSTRACT

Apparatus for continuously and rapidly forming trays of highly uniform elastomeric soil plugs comprises means for continuously mixing a water-containing soil slurry with a water-reactive pre-polymer compound, means for supplying the soil slurry and the pre-polymer compound to the mixing means at respective controlled rates, and means for delivering the mixed soil slurry and pre-polymer compound to a dispensing station for dispensing into mold receptacles; the receptacles are disposed in a closed path and carried by transport means seriatim past the dispensing station. Releasable bias means biases a tray mold member against a base mold member within each receptacle so as to extrude soil-pre-polymer mixture into plug-molding cavities of the tray mold member. The bias means is released after the plugs within the tray mold member have cured. The operation of the apparatus coordinates the various steps in the plug-molding process with stages of the chemical reaction between the water and pre-polymer compound to form highly uniform plugs at the maximum rate allowable by the chemical reaction.

36 Claims, 12 Drawing Figures

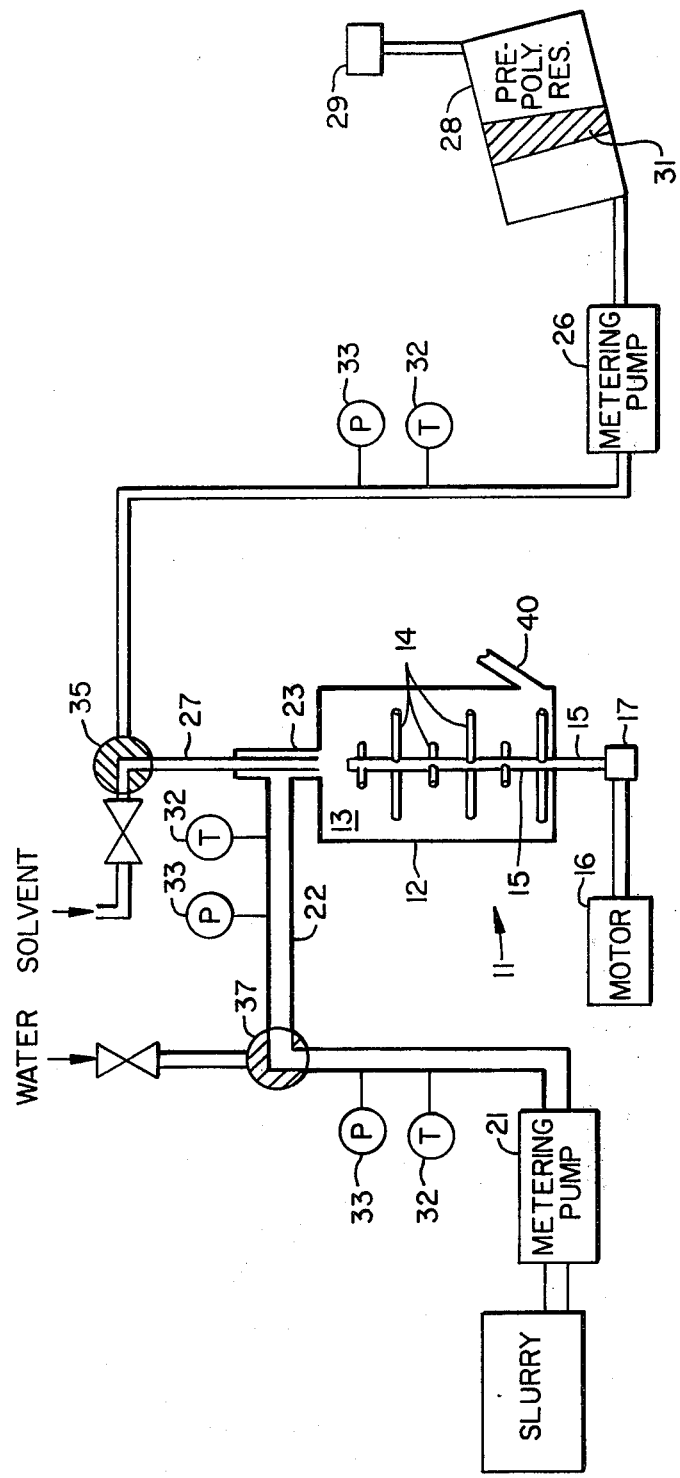
FIG._1.

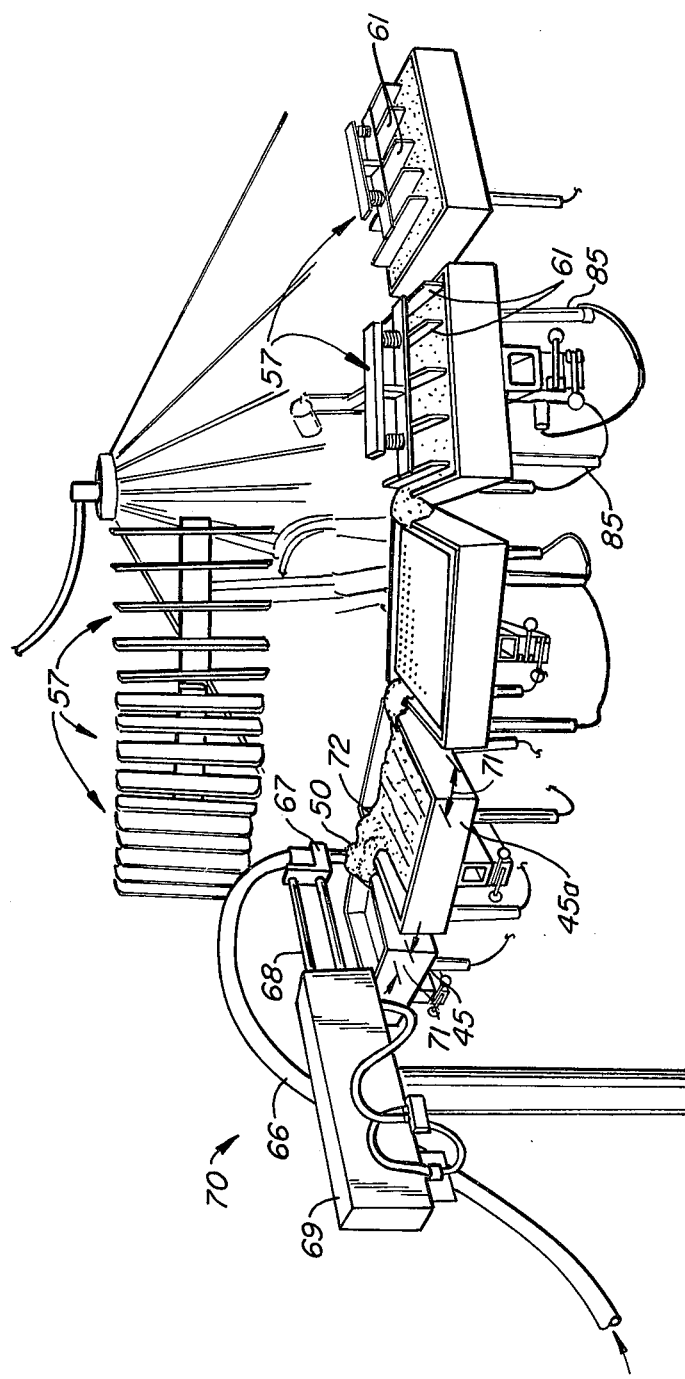
FIG._2.

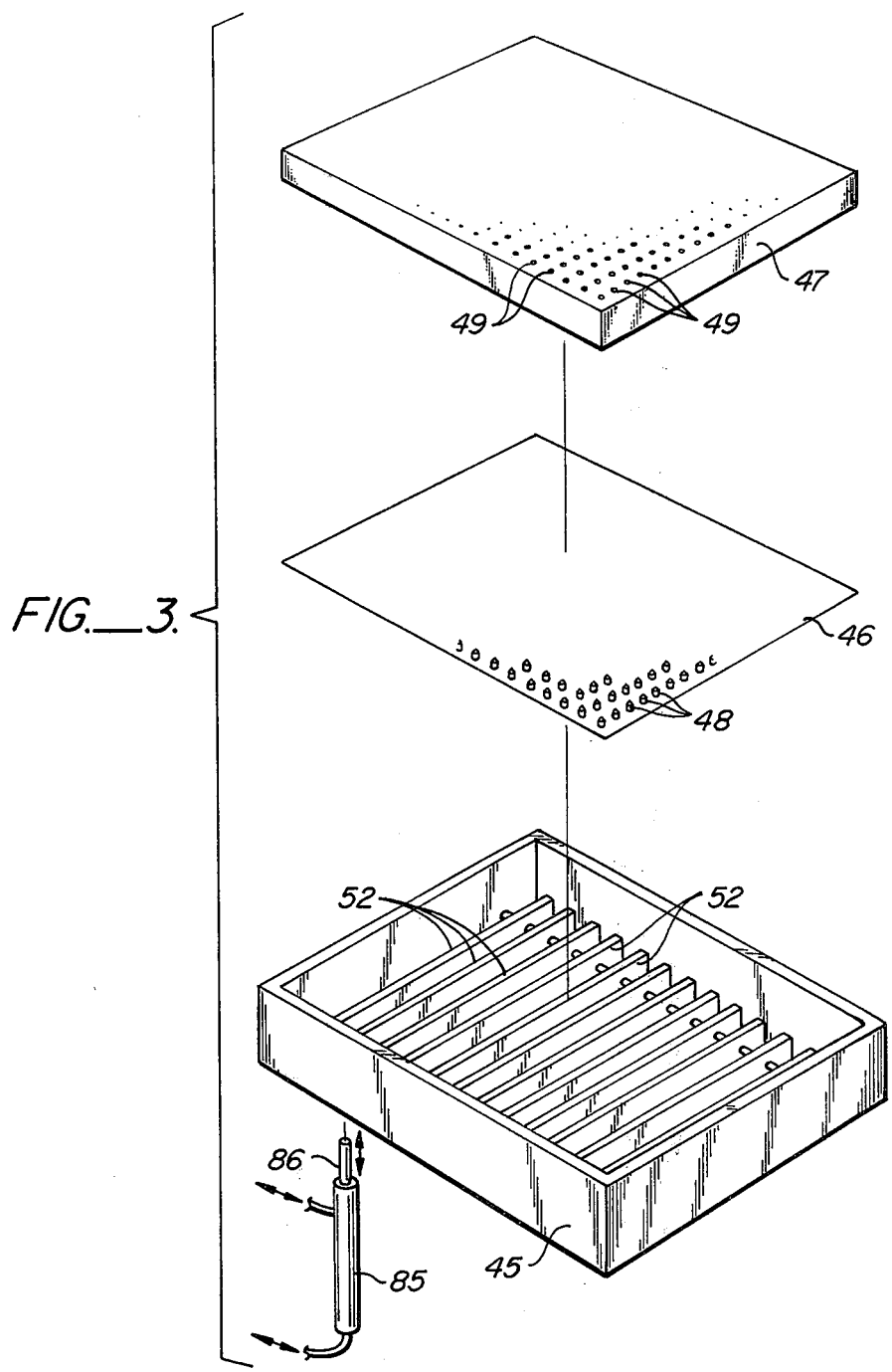
FIG._3.

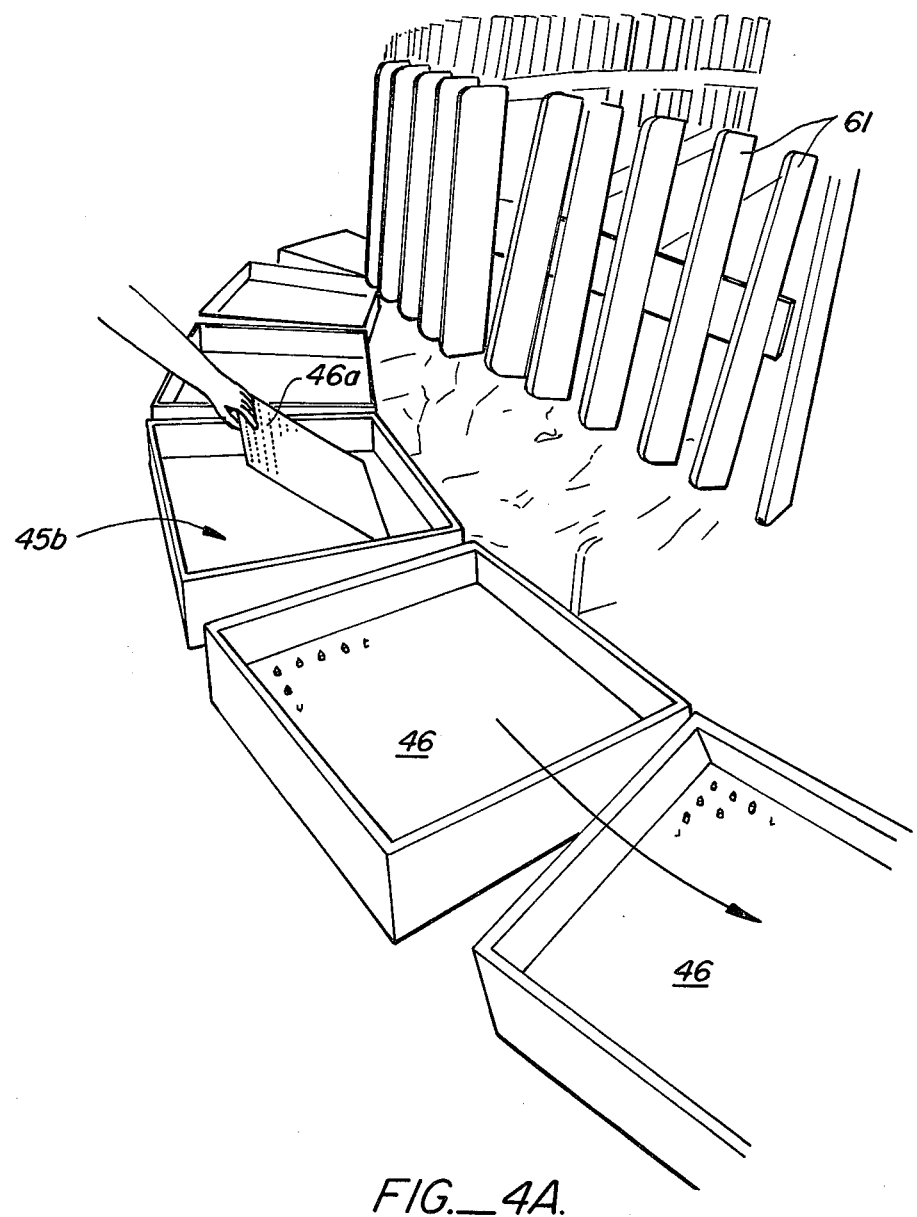
FIG._4A.

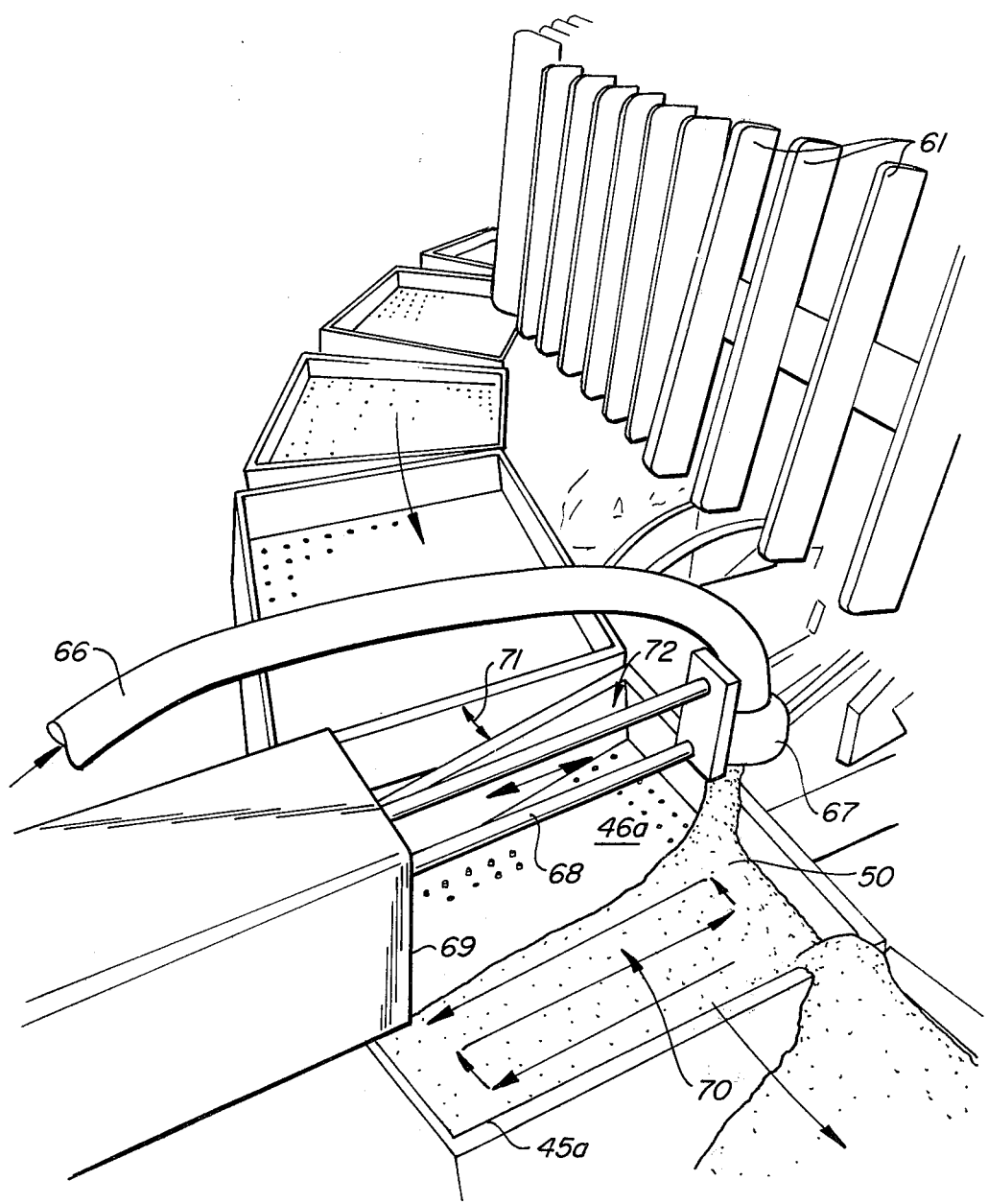
FIG._4B.

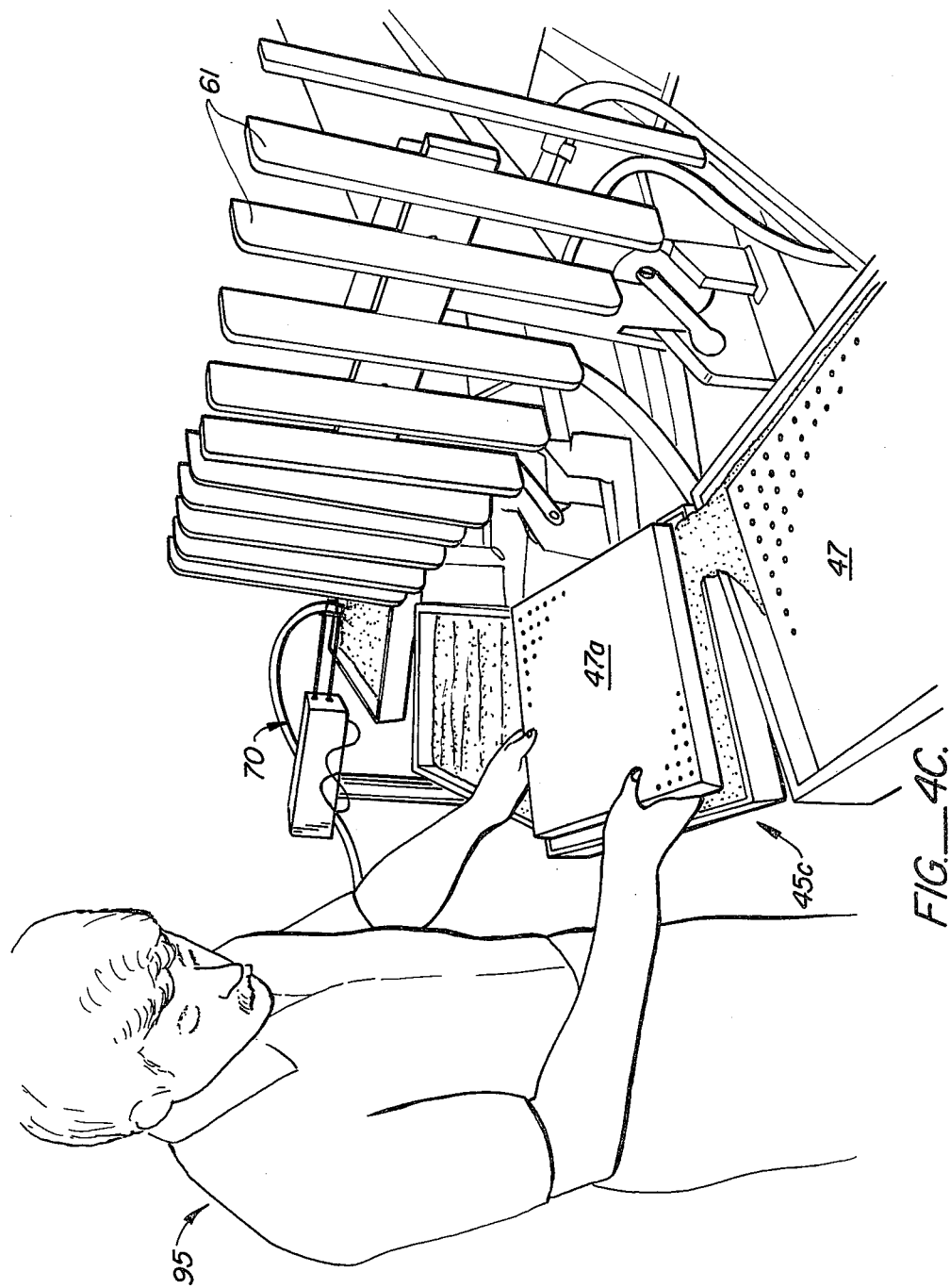

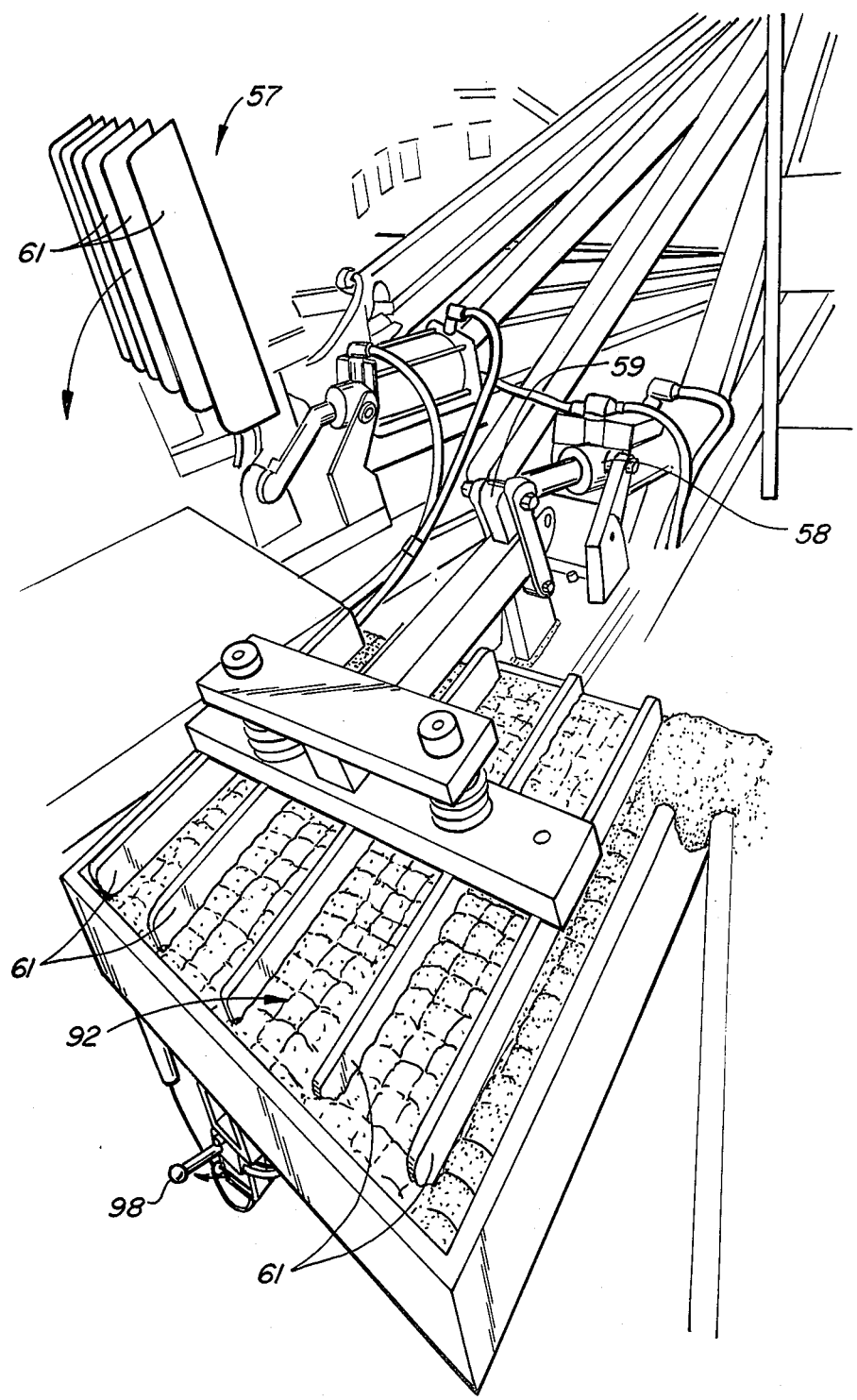
FIG._4D.

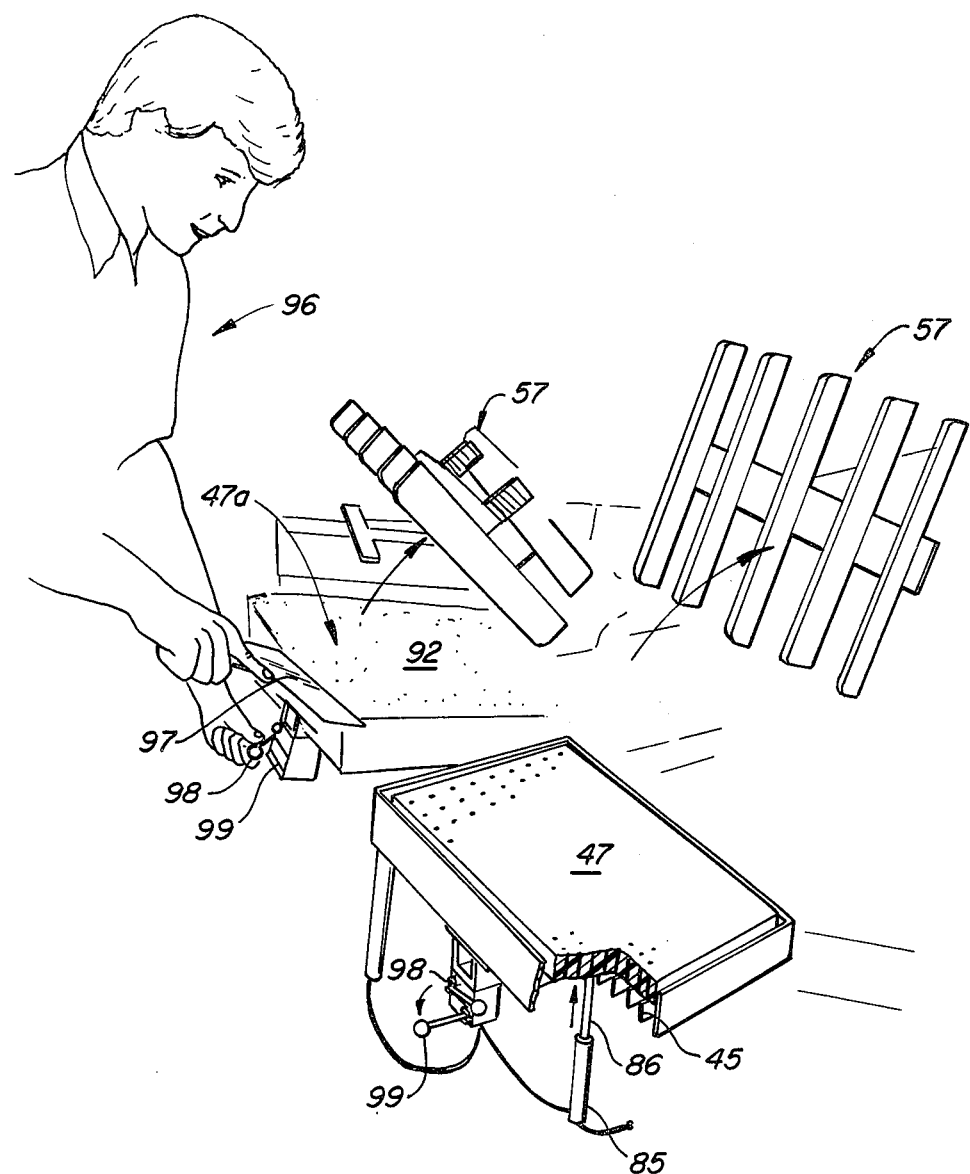
FIG._4E.

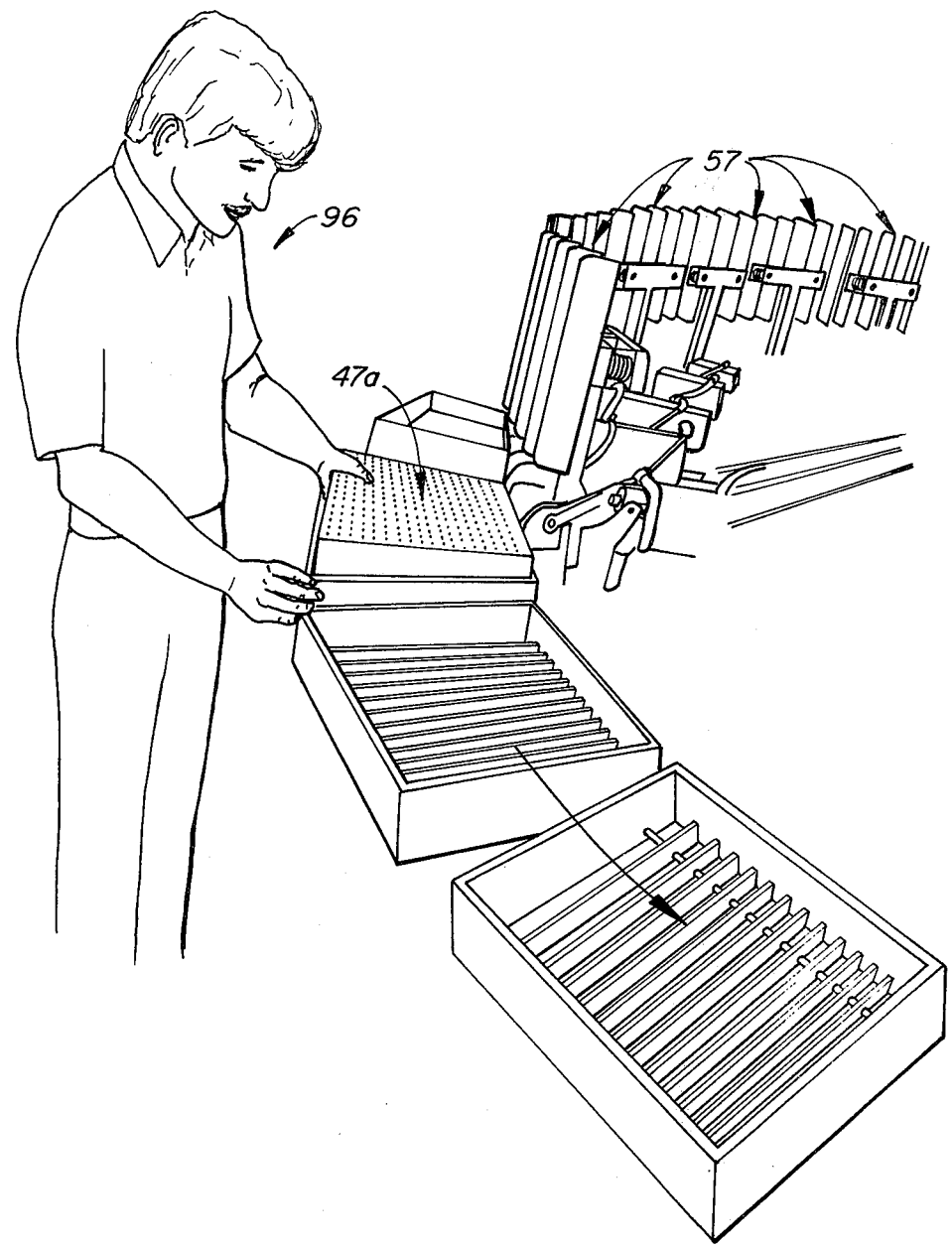
FIG._4F.

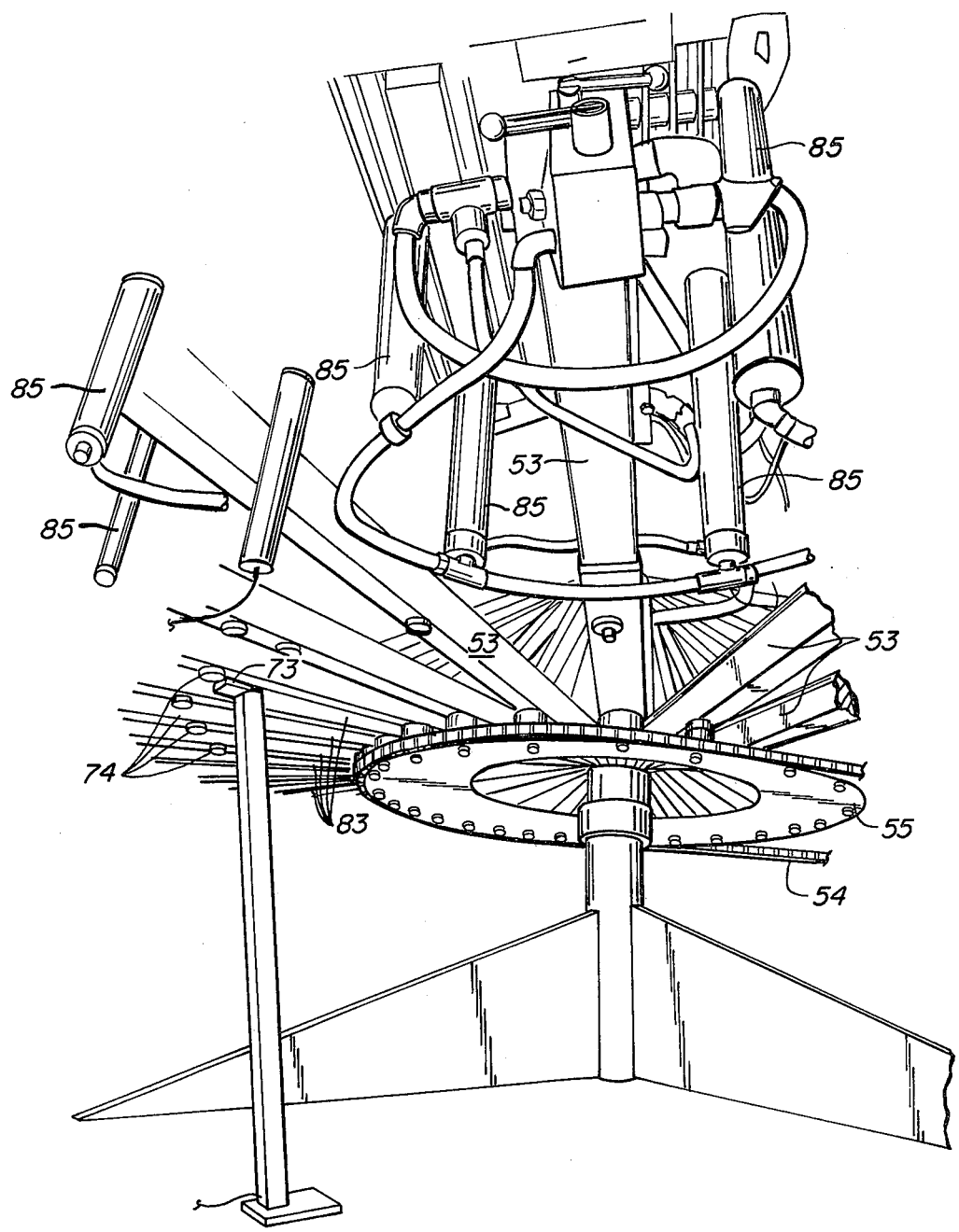
FIG._5.

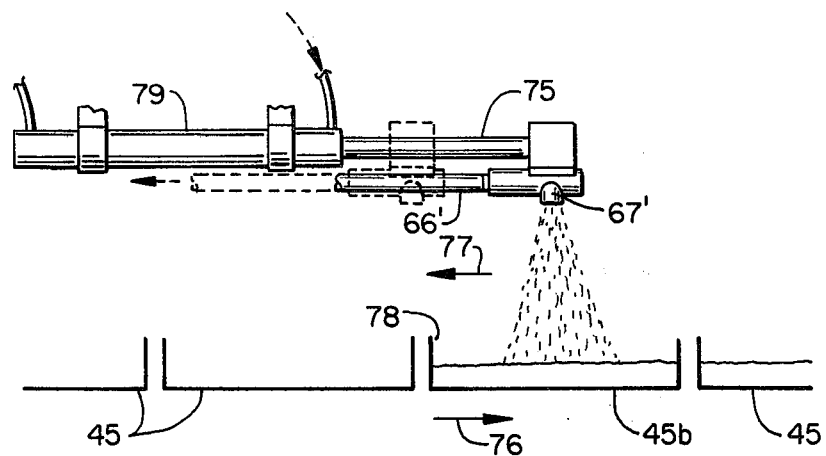
FIG._6.
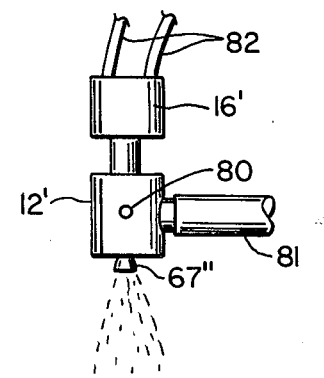
FIG._7.

METHOD AND APPARATUS FOR MAKING SOIL PLUGS

BACKGROUND OF THE INVENTION

The invention relates to soil plugs for use in sprouting seedlings for later transplantation. In particular, it relates to a method and apparatus for forming elastomeric soil plugs from a slurry of soil and polymer resin.

Soil plugs or other compact soil masses are widely used in crop transplanting systems. In such systems seedlings are grown in high concentration in a greenhouse under controlled conditions which assure a high starting rate. The seedlings, started from seeds planted in the soil plugs or masses, are then transplanted to the field when the seedlings reach a certain level of maturity. In the transplant approach to crop cultivation, the transplants can be spaced apart in the field a predetermined distance to provide sufficient, but not excessive, growing room per plant, thereby giving maximum yields per acre of valuable farmland. In the traditional and more wasteful direct seeding techniques, by contrast, one first overplants a field with seeds (not seedlings) and then thins to the optimal growing density the young plants managing to sprout.

Although the transplanting method has proved to be an advance over the direct seeding technique, it is not free from problems. Seedlings have delicate root systems which are especially vulnerable to handling and mechanical shock. This vulnerability makes it especially difficult to transplant the seedlings by automated techniques without the loss of some portion of them. The lost seedlings must then be replaced—usually by hand—if the farmland is to yield a full crop.

The recent development of elastomeric soil plug technology has greatly facilitated the automated handling and transplanting of seedlings. Elastomeric soil plugs are plugs formed from a mixture of soil and an elastomeric, biodegradable, polymer resin, which binds the soil together and provides it with some resiliency. When a seed planted in such a plug sprouts, its root system permeates the elastomeric soil composition, which has sufficient resiliency to enable machine handling of the seedling root system without killing the plant.

Elastomeric soil plugs and several ways of manufacturing them are disclosed by Dedolph in his pioneering U.S. Pat. Nos. 4,034,508 and 4,130,072. In one method of manufacture, two sets of semi-cylindrical mold elements are carried along endless conveyers. During a portion of the path of travel of the conveyers, corresponding sets of mold elements join to form a set of cylindrical mold cavities for the soil plugs. The mold cavities are automatically filled with a slurry of organic pre-polymer compound and soil mix. The slurry cures as the mold cavities are carried along the conveyers, and after a sufficient run of the conveyers the mold elements separate to release the fully cured soil plugs. To facilitate handling of the plugs, Dedolph teaches the method of interconnecting them by inserting a narrow strip of flexible material between the two sets of mold elements as they come together. In this way an interconnected string of plugs is formed. The plugs are seeded and the seeds germinate, while the plugs are interconnected. When the seedlings are ready for transplanting, the interconnecting strip is severed and the seedlings planted in the ground.

According to another method of manufacture disclosed by Dedolph, a top mold member defining a plurality of mold cavities is positioned on top of a bottom mold member. A cam engaging the bottom mold member from below regulates the relative position of the two mold members and consequently the depth of the mold cavities. The soil-resin slurry is poured into the mold cavities for curing. The soil-resin mix is such that as it sets up, it expands. Dedolph accommodates this expansion with the regulating cam; as the mixture expands, the cam allows the top and bottom mold members to separate. After the plugs have fully cured, the two mold members can be squeezed together to eject the finished plugs. This method of manufacture can also be used to form two-dimensional arrays of plugs interconnected by flexible strips.

For efficient soil plug operations—whether they be seeding, transporting or transplanting—the plugs must be handled in large blocks or units rather than individually. A unit formed by interconnecting plugs with a flexible strip or strips, as taught by Dedolph, poses handling problems. The root systems of the developing seedlings tend to get bound to or entangled with the flexible strips and, consequently, are likely to be damaged when the strips are severed.

Another method of forming soil plugs in large blocks starts with a tray having a plurality of cavities in it, which serve as molds for individual plugs. After the plugs have been formed within the cavities, the tray serves as a matrix to hold the plugs during later operations. The plugs are seeded within the trays, the seedlings develop within the trays, the trays are moved from the greenhouses to the field, and they are loaded onto machines which automatically remove individual seedling plugs and plant them in the ground.

In the past, soil plugs have been formed within such carrying trays in the following manner. The carrying tray itself forms one part of a mold, referred to herein as the tray mold member. Cooperating with the tray mold member is a base mold member, which has an array of projections on one surface. When the base and tray mold members are indexed to one another, the array of projections protrude into a corresponding array of plug molding cavities within the tray mold member. These cavities are generally frustoconical in shape; with the mold members in their indexed configuration, the base member seals the broader ends of the cavities and its array of projections extend therein a measured distance to define seed cavities in the molded plugs.

To mold the soil plugs, the base mold member is first set within a mold receptacle having inside dimensions registering with the dimensions of the base mold member. Next a soil and pre-polymer resin mixture is poured into the receptacle to cover the base mold member. It is possible to vibrate the receptacle to cause the high-viscosity mixture to spread out evenly. The tray mold member is then set within the receptacle and urged downward against the base mold member so as to force the soil-resin mixture into the plug-molding cavities. Clamped in this configuration, the mold members remain motionless with respect to one another while the soil-resin mixture swells and then cures to form the elastomeric soil plugs.

The carrying-tray method greatly facilitates automated handling of the soil plugs, from seeding to transplanting, while it eliminates "root system shock" experienced in other transplanting schemes. Root system shock is caused by broken root hairs, or exposure of roots to air for long periods of time.

The past method of manufacturing the soil plugs within the carrying trays, however, has its shortcomings. Sometimes the plugs do not completely fill the plug-molding cavities; the stunted plugs are then mishandled or mutilated by the automated handling equipment. At other times the plugs are formed with voids within the elastomeric medium, which introduces weak points into the plugs, hindering mechanical handling. Sometimes the plugs are loosened and slip from the carrying trays. And at all times too much of the expensive pre-polymer compound is wasted. But one shortcoming of the past manufacturing method stands out: it is too slow.

SUMMARY OF THE INVENTION

The present invention provides a method and apparatus for forming highly uniform elastomeric soil plugs of homogeneous composition and having well defined uniform seed cavities. The plugs are formed directly in the carrying trays in a rapid and continuous manner with very little waste of the expensive ingredients of which the plugs are composed.

The present invention utilizes a tray mold member having an array of plug-molding cavities therein together with a base mold member having a corresponding array of members protruding from a surface thereof. The two arrays register with one another so that a protruding member projects into each plug-molding cavity to define what will become the seed cavity in the finished plug. The plugs are formed from a mixture of soil slurry and a pre-polymer compound of the type which reacts with water to form a hydrophilic elastomeric resin. The soil slurry is itself a mixture of water, soil, and other fertilizing or pH-balancing agents. The soil slurry and pre-polymer compound are known to undergo the following changes when they are mixed. A chemical reaction begins when the pre-polymer compound comes in contact with the water of the slurry. After a short period of time, referred to herein as the primary reaction time, the mixture begins to expand or swell during which the elastomeric soil plug medium emerges. After the swelling ceases, a period of off-gassing and curing follows. When this reaction is allowed to take place with the apparatus and according to the methods of the present invention, soil plugs are formed showing very little, if any, variation in size and density, having no unwanted voids, and generally being of superior qualities for use with automatic seeding and transplanting machines.

In the method of forming soil plugs as practiced in the present invention, a water-reactive pre-polymer compound is brought continuously into contact with a water-containing soil slurry, so as to initiate the chemical reaction. Upon being brought into contact, the soil slurry and pre-polymer compound are mixed and continuously dispensed into receptacles, in which the base mold members have been set. It is an aspect of the present invention that the mixture is dispensed continuously into any one receptacle and from one receptacle to another; moreover, the time span in which the pre-polymer compound and soil slurry are mixed and dispensed is short compared with the primary reaction time of the aforementioned chemical reaction.

The mixture is dispensed continuously and seriatim into the mold receptacles to form an approximately uniform layer in each receptacle covering the base mold member therein. Before the layer of mixture noticeably expands, a tray mold member is positioned within each receptacle upon the layer, and the tray and base mold members are urged together so as to squeeze or extrude the soil-resin mixture therebetween into the plug-molding cavities of the tray mold members. The tray and base mold members are then clamped together in this configuration while the soil-resin mixture cures. Another aspect of the invention is the timing with which the tray and base mold members are urged together, for unwanted voids in the elastomeric medium can be prevented if the mold members are brought substantially flush with one another before any noticeable expansion or swelling of the mixture occurs.

After the plugs have cured, the tray mold member with its complement of soil plugs is separated from the base mold member. At this stage the tray mold member will show some flashing of excess soil-resin mixture on its various surfaces. In the past, the flashing has merely been scraped off. It has been found in accordance with the present invention that the trays of soil plugs as formed herein are much more efficiently seeded by some types of seeding devices if the seeding takes place before the flashing is scraped off.

Apparatus constructed in accordance with the invention for practicing the above method comprises a means for mixing the soil slurry with the pre-polymer compound, means for supplying the soil slurry and the pre-polymer compound to the mixing means at respective controlled rates, and means for delivering the mixed soil slurry and pre-polymer compound from the mixing means to a dispensing station. The apparatus also includes a plurality of mold receptacles, each adapted to hold a base mold member and tray mold member with the arrays of protruding members and plug-molding cavities indexed to one another. It is a feature of the invention that the mold receptacles are disposed along a closed path. A transport means is operable to transport the mold receptacles about the closed path and seriatim past the dispensing station. There the mixture is introduced into the mold receptacles and onto the base mold members situated therein in accordance with the above-described method. Proximate each of the mold receptacles and transportable therewith by the transport means is a releasable bias means for biasing a tray mold member against a base mold member within each of the receptacles. The bias means is capable of urging a tray mold member against a base mold member with sufficient force to press the two members substantially flush against one another and extrude the mixture therebetween into the plug-molding cavities of the tray mold member. The bias means may be released after the plugs have sufficiently cured, as explained more fully hereinbelow.

Apparatus for mixing and delivering the soil-resin mixture in accordance with the present invention is preferably comprised of means defining a mixing chamber and agitation means mounted therein. The soil slurry and pre-polymer compound are continuously delivered to the mixing chamber at respective controlled rates, and means communicating with the mixing chamber is provided for delivering the mixture to the subsequent soil plug molding means. In the apparatus of the present invention, the rates at which the ingredients are delivered to the mixing chamber, the dimensions of the chamber, and the nature of the agitation means mounted therein all cooperate to mix the soil slurry and pre-polymer compound and to pass the resulting mixture from the mixing chamber continuously in a time span which is short compared with the primary reaction time of the aforementioned chemical reaction. That is to say, when a small unit of soil slurry and corresponding unit of pre-resin compound first come into contact in the mixing chamber, they will be thoroughly mixed and passed on to the soil plug molding means in a time span short compared with the primary reaction time. To control the primary reaction time, the apparatus may also include heating means for maintaining the pre-polymer compound and the soil slurry at predetermined temperatures. Furthermore, to prevent premature initiation of the chemical reaction, desiccator means may be coupled to that part of the apparatus which carries the pre-polymer compound alone.

For all the soil plugs of a tray to have uniform characteristics, it is important that the mixture be introduced into the mold receptacles in an approximately uniform layer. In one embodiment of the invention the means for delivering the mixture to the mold receptacles includes a dispensing outlet mounted at the dispensing station for reciprocation over the receptacles. As the receptacles are carried seriatim passed the dispensing station, the dispensing outlet moves back and forth over each tray so as to introduce the mixture in a succession of coalescing rows to form the approximately uniform layer. In another embodiment of the invention a nozzle may be mounted over the receptacles to spray the mixture onto the base mold members within the receptacles.

It is an object of the invention to hold to a minimum the amount of mixture wasted as the dispensing outlet or nozzle passes from one receptacle to the next. In the first embodiment above, synchronization means is provided for positioning the dispensing outlet at the point of shortest separation between two adjacent trays as the first tray leaves the dispensing station and the next tray enters. In the second embodiment above, means is provided for accelerating the spray nozzle across the gap between two adjacent trays as the first leaves the dispensing station.

It is a feature of one embodiment of the invention that the transport means is provided by a carrousel on which the receptacles are supported in a circular path. The carrousel itself is mounted for rotation about the center of the circular path. In this way the various stages of the aforementioned chemical reaction and the steps of the present method can be correlated with defined positions on the circular path to assure accuracy and repeatability in the timing of those steps.

The invention possesses other features and advantages, an understanding and appreciation of which can be gained by reference to the remaining portions of the specifications and the attached drawings.

BRIEF DESCRIPTION OF THE DRAWINGS

FIG. 1 is a block schematic diagram showing the system for mixing the soil slurry and pre-polymer compound in accordance with the present invention.

FIG. 2 is an overall perspective view of a carrousel and dispensing means constructed in accordance with the invention.

FIG. 3 is an exploded view showing a tray mold member, base mold member, and mold receptacle.

FIG. 4A is a perspective view of a portion of a carrousel showing a base mold member being placed in a mold receptacle.

FIG. 4B is a perspective view of a dispensing outlet mounted for reciprocation over the mold receptacles.

FIG. 4C is a perspective view showing a worker placing a tray mold member in a mold receptacle on a layer of soil-resin mixture.

FIG. 4D is a perspective view of bias means clamping a tray mold member in a mold receptacle.

FIG. 4E is a perspective view of a worker releasing the bias means and scraping off the residual flashing.

FIG. 4F is a perspective view of a worker removing a finished tray of soil plugs from a mold receptacle.

FIG. 5 is a perspective view of the underside of the carrousel showing a drive mechanism for rotating the carrousel, means for ejecting the mold members from a mold receptacle, and a microswitch.

FIG. 6 is an elevational view of an alternative dispensing means including a dispensing nozzle and means for accelerating the nozzle across the gap between two adjacent mold receptacles. The accelerating means is shown in its fully extended position in solid lines; the fully retracted position, reached after the gap has been traversed, is shown in phantom.

FIG. 7 is an elevational view of another alternative means for dispensing the soil-resin mixture into the mold receptacles.

DETAILED DESCRIPTION OF THE PREFERRED EMBODIMENTS

The method and apparatus of the present invention are directed to the formation of the elastomeric soil plugs utilizing a chemical reaction such as described by Dedolph in U.S. Pat. Nos. 4,034,508 and 4,133,072. The plugs are formed from a chemically active mixture of soil slurry and pre-polymer compound. The soil slurry may be composed, for example, of peat moss, water, dolemite (to counteract the acidity of the peat moss), and other fertilizing agents. The pre-polymer compound is typically a polyurethane pre-polymer which reacts with water to form a hydrophilic and elastomeric polymer resin. The resin formed by this reaction acts as a glue binding the soil particles together in the finished soil plugs. Several suitable pre-polymer compounds are known in the art and are available commercially, e.g., FHP-3000 available from W. R. Grace & Co.

When the pre-polymer compound is mixed with water the following stages can be distinguished in the ensuing chemical reaction: First, a primary reaction occurs, in which the resin formation is initiated. Second, the mixture noticeably begins to expand or swell as the reaction progresses. Expansion by the mixture is commonly referred to in the art as "blowing." Third, an off-gassing and curing stage begins. During this stage the mixture gives off gasses, typically carbon dioxide, which are trapped in the form of small bubbles in the soil plug medium. Finally, the mixture cures to form the finished elastomeric soil plug medium. The time period in which the primary reaction occurs and before the mixture noticeably begins to expand is referred to herein as the primary reaction time. The method and apparatus of the invention are coordinated with the various stages of this chemical reaction. This coordination, an essential aspect of the invention, serves to achieve a much more uniform complement of soil plugs, free of irregularities or deformities, molded within the carrying trays. Moreover, it enables the trays of plugs to be produced at an optimal rate with no wasted time between processing steps.

The system for controlled mixing of the soil slurry and pre-polymer compound in the present invention is illustrated in FIG. 1. Mixing means, designated generally as 11, comprises means 12 defining a mixing chamber 13 with agitation means, such as mixing blades 14, mounted therein. The blades 14 are fixed in a successively offset relation to one another along pivotable shaft 15. Motor 16 drives shaft 15 through coupling 17.

The soil slurry is pumped at a controlled rate by metering pump 21 through conduit 22 and into chamber 13 at the top through inlet conduit 23. Metering pump 21 is connected to slurry supply 24. Since the soil slurry is itself a mixture, which is prepared in its own mixing chamber, slurry supply 24 is conveniently provided by funneling the soil slurry directly into metering pump 21 from the soil-slurry mixing chamber. Alternatively, slurry supply 24 may be provided by a reservoir or holding tank.

The pre-polymer compound is pumped by metering pump 26 at a controlled rate through conduit 27 into chamber 13. To provide for faster mixing, conduit 27 is mounted concentric with and extending through inlet conduit 23 to discharge into mixing chamber 13 at roughly the same position as inlet conduit 23. The concentric arrangement of conduits 23 and 27 mounted with their discharge ends substantially even with one another serves to introduce the solutions into chamber 13 in intimate proximity to one another. In this way the water-reactive pre-polymer compound is thrust into contact with the water of the slurry immediately upon entering chamber 13.

The pre-polymer compound is supplied to metering pump 26 from reservoir 28. The pre-polymer compound is typically purchased in 55 gallon drums, which may themselves provide reservoir 28. When a 55 gallon drum is used in this manner, it is best mounted at an angle, as illustrated in FIG. 1, or in vertical arrangement to allow for thorough draining of the drum.

An aspect of the present invention is that the various operations performed by the apparatus are precisely correlated with the stages of the aforementioned chemical reaction. For proper correlation the reaction must begin in mixing chamber 13. Therefore, dessicator means 29 is coupled to metering pump 26 and reservoir 28 to prevent moisture contamination and premature reaction of the pre-polymer compound.

It is generally known that the temperature affects the primary reaction rate of the aforementioned chemical reaction and hence the timing of the subsequent operations of the apparatus. Moreover, the temperature of the soil-resin mixture affects the quality of the finished soil plugs. If the mixture is too cold, it will not swell enough to completely fill the plug-molding cavities. On the other hand, if the mixture is too hot, it will shrink during the curing stage. The plugs then fall partway through the tray, only to be improperly seeded or crushed by subsequent machines for automatic handling. Furthermore, since the chemical reaction of the pre-polymer compound is generally exothermic, a certain amount of heat, depending upon the particular compound used, will be released in the soil-resin mixture to raise the temperature. Thus, it is important that the temperature of the pre-polymer compound and of the soil slurry be maintained within defined limits as these solutions are delivered to chamber 13.

The slurry temperature is generally controlled by the temperature of the water used to mix the slurry. Slurry source 24 may include separate heating means and conduit 22 may be wrapped with heating tape. When a 55 gallon drum is used as reservoir 27, the apparatus is provided with a heading band 31 adapted for application to the drum for maintaining the pre-polymer compound at a predetermined temperature. It has been found that when FHP-3000 is used as the pre-polymer compound, its temperature is typically maintained in the range of 94°-96° F., and the slurry temperature is typically maintained in the range of 112°-116° F. These are only typical ranges. It is found that depending upon the ambient conditions some amount of experimentation is often needed to determine the optimal operating temperatures.

The apparatus is preferably provided with temperature and pressure gauges 32 and 33, as illustrated in FIG. 1, for monitoring the temperature and flow of the fluids to chamber 13.

To clean the system when not in use, the apparatus is provided with the capability of purging with water and solvent. Valve 35 shuts off the flow of pre-polymer compound from metering pump 26 and connects the source of solvent to conduit 27. Valve 37 shuts off the flow of soil slurry from metering pump 21 and connects conduit 22 with a source of water for flushing the system. Typical solvents suitable for use with the system include methylene chloride or acetone. The preferred order for cleaning is, first, a flush with solvent, followed by a flush with water. If this order is followed, then no pre-polymer compound will remain in conduit 27 to react with any water or moisture introduced when inlet conduit 23 is flushed with water.

Mixing chamber 13 is provided with an outlet 40 through which the mixed soil slurry and pre-polymer compound passes for use in other portions of the apparatus. To assure that only thoroughly mixed ingredients pass on to the remaining apparatus, outlet 40 is preferably located near the bottom of mixing chamber 13 removed from inlet conduit 23.

An overall perspective view of the plug-forming means is shown in FIG. 2. A plurality of mold receptacles 45 are arranged along a closed path, here, a circle. Each mold receptacle 45 is adapted to receive a base mold member 46 and a tray mold member 47, as can be seen in the exploded view in FIG. 3. Base mold member 46 has an array of protruding members 48 thereon, and tray mold member 47 has a corresponding array of plug-molding cavities 49. Members 48 are sized and shaped to define the seed cavities in the molded plugs. An individual mold receptacle 45 is itself dimensioned to receive the mold members 46 and 47 and hold them snugly with the corresponding arrays in alignment with one another. The inner dimensions of the lower portion of receptacle 45 register with the mold members 46 and 47; the sides of receptacle 45 are angled outward slightly to allow the mold members to be inserted more easily. It is preferable to provide mold receptacle 45 with a slotted bottom, formed in the illustration of FIG. 3 by a plurality of parallel members 52.

The plurality of mold receptacles 45 are supported on transport means for transporting the receptacles 45 around the closed path. In a preferred embodiment, the transport means is provided by a carrousel, wherein each mold receptacle 45 is supported on an arm 53 extending radially from the carrousel center. See FIG. 5. The carrousel is mounted for rotation about its center and is driven by drive chain 54 and sprocket 55 in a conventional manner.

Proximate each mold receptacle 45 is a means for securing the mold members within each receptacle 45 in curing configuration and maintaining the mold members and receptacles in their curing configuration until the plugs are sufficiently cured. Full and complete curing of the plugs can take a long time, sometimes more than twenty-four hours. However, shortly after the blowing stage is completed, the plugs will be cured to a sufficiently stable degree to allow the mold members to be released. One skilled in the art will readily be able to determine by observation the optimum mold clamping time.

The mold members and mold receptacles may be maintained in curing configuration by releasable bias means 57 positioned proximate each mold receptacle 45 and transportable along with its adjacent mold receptacle around the closed path. Bias means 57 urges tray mold member 47 against base mold member 46 with sufficient force to press the tray and base mold members 47 and 46 substantially flush against one another. In this way the layer of soil-resin mixture 50 is extruded into the plug-molding cavities of tray mold member 47.

In a preferred embodiment, bias means 57 is provided by a cam-over-center press, as illustrated in FIG. 4D. The cam-over-center press is operated by pneumatic cylinder 58. It includes locking cam member 59, which slides into position to lock bias means 57 in its fully biased configuration. Cam member 59 prevents base and tray mold members 46 and 47 from parting as the mixture contained therebetween expands. Bias means 57 further includes spaced-apart members 61 for engaging tray mold member 47 and exerting a downward force thereon. The parallel members 61 are positioned so as not to block any of the plug-molding cavities in the exposed surface of tray mold member 47, as discussed hereinabove.

In making trays of soil plugs before the present invention, it was the practice to pour the soil-resin mixture into a mold receptacle by hand. This procedure proved inadequate for several reasons. First, it takes too long—the mixture can start to swell before a uniform layer is achieved or before a tray mold member is clamped in curing configuration, which is undesirable for reasons explained below. Moreover, it slows the overall operation, thereby limiting the number of trays prepared per day. Second, any residual mixture not poured into a mold receptacle during the proper stage of the chemical reaction is wasted. Third, it is difficult to control the precise amount of mixture poured into a receptacle. A layer of incorrect thickness leads either to further waste or to irregularly formed plugs.

The means for dispensing the soil-resin mixture 50 into mold receptacles 45, illustrated in FIGS. 2 and 4B, overcomes these problems. Dispensing hose 66 has a dispensing outlet 67 at one end mounted over mold receptacles 45 at a dispensing station, designated generally as 70. The other end of dispensing hose 66 is connected to outlet 40 of mixing chamber 13. As seen in FIGS. 2 and 4B, dispensing outlet 67 is mounted on extensible arm 68 extending from housing 69 for reciprocation over mold receptacles 45. The back-and-forth motion of outlet 67 and arm 68 is controlled by an air-logic system. As the soil-resin mixture 50 continuously flows from chamber 13 through outlet 40, outlet 67 dispenses the mixture in a succession of coalescing rows. Although the mixture has a generally high viscosity, and consequently poor flow characteristics, the succession of juxtaposed and slightly overlapping rows will nevertheless flow into one another sufficiently to form an approximately uniform layer. One skilled in the art will appreciate that with this embodiment of the dispensing means it may be necessary to level the material in the receptacles after it is dispensed. In the embodiment of FIGS. 2 and 4B, housing 69 is fixed in a stationary position. Arm 68 and outlet 67 are reciprocated back and forth as mold receptacles 45 are transported along the closed path in a direction transverse to reciprocating arm 68.

The soil-resin mixture 50 flows continuously from dispensing outlet 67 as mold receptacle 45 is filled and as outlet 67 travels from one mold receptacle to the next. Since mold receptacles 45 are basically rectangular in shape, when arranged along a curvilinear path such as the circular path of FIG. 2, they will be separated by angular gap 71. It is desirable to minimize the amount of mixture wasted as outlet 67 moves from one receptacle to the next. For this purpose, the apparatus includes synchronization means for positioning outlet 67 over a mold receptacle at the point of shortest separation between it and the next following receptacle synchronously with the departure of the first receptacle from the dispensing station.

The operation of the synchronization means can be understood with reference to FIG. 2. When mold receptacle 45a has received its layer of mixture and is about to depart from the dispensing area 70, outlet 67 is automatically positioned at corner 72 of receptacle 45a adjacent the shortest end of the angular-shaped inter-receptacle gap 71. To coordinate the motion of outlet 67 with the transverse motion of receptacles 45 along the closed path, microswitch 73 is mounted beneath the mold receptacles to be tripped by the mold-receptacle support means. As illustrated in FIG. 5, microswitch 73 is tripped by lugs 74 on radially extending arms 53. When microswitch 73 is tripped, it signals the air-logics control mechanism to move outlet 67 to its fully extended position. Microswitch 73 is positioned so that the extension of outlet 67 will bring it over corner 72. Other means, such as timing chains or the like, could also be used to provide the synchronized motion called for herein.

An alternative means for dispensing the soil-resin mixture 50 into mold receptacles 45 is shown in FIG. 6. Dispensing hose 66' connected to outlet 40 from mixing chamber 13 terminates with dispensing nozzle 67'. Nozzle 67' sprays the soil-resin mixture in a band having a reach in the direction of motion of the receptacles which is less than the length of the receptacles themselves in the same direction. As receptacles 45 move along beneath nozzle 67', the band of spray sweeps across the receptacles to spray mixture roughly uniformly onto a horizontally extending member within mold receptacle 45.

Waste of soil-resin mixture between receptacles is reduced by the following construction. Nozzle 67' is mounted on retractable arm 75. As a mold receptacle, such as receptacle 45b in FIG. 6, is transported under nozzle 67', arm 75 is slowly extended in the same direction as the movement of receptacles 45, indicated by arrow 76. The speed at which arm 75 is extended is slower than the speed of the receptacles along the closed path. Consequently, the band sprayed by nozzle 67' slowly travels across receptacle 45b in the direction indicated by arrow 77. When the band reaches end 78 of receptacle 45b, arm 75 is quickly retracted to the position shown in phantom in FIG. 6. In this manner the inter-receptacle gap is traversed quickly to reduce the amount of wasted mixture. The motion of arm 75 is controlled by pneumatic cylinder 79, which can be correlated with the movement of the mold receptacles by microswitch 73 described above.

In another alternative embodiment, means 12 defining mixing chamber 13 may be mounted at dispensing station 70 directly over the closed path of mold receptacles 45. See FIG. 7. In this configuration, motor 16' driving the agitation means is mounted above the means 12' defining a mixing chamber. In place of outlet 40, a spray nozzle 67" is provided at the bottom of the mixing chamber defined by means 12'. The mixing chamber is provided with inlet 80 connected to conduit 22 and inlet 81 connected with conduit 27. Mounted in this position, motor 16' is generally operated in a water-laden environment. As a safety precaution, therefore, a non-electrical motor should be used, such as a hydraulic motor controlled through hydraulic lines 82.

To aid in quickly removing the base and tray mold members 46 and 47 once the soil plugs have cured sufficiently, means is provided for ejecting the base and tray mold members as a unit from mold receptacles 45. For quick, yet controlled removal of the base and tray mold members, four pneumatic cylinders 85 are symmetrically positioned beneath each mold receptacle. See FIG. 5. Pneumatic cylinders 85 are mounted so that their associated cylinder rods 86, visible in FIGS. 3 and 4E, extend vertically through the slotted bottom of a mold receptacle 45 to contact the underside of base mold member 46 positioned therein. The four cylinders 85 mounted beneath each mold receptacle are operated in unison to eject each tray and base mold pair and hold it in balanced position for subsequent disposition.

The sequence of events in the operation of the present apparatus may be understood with reference to FIGS. 4A–4F. These events, of course, occur simultaneously and continually in different regions of the apparatus. The succession presented here traces the formation of a single complement of soil plugs in an individual carrying tray. The situs of a particular event in the apparatus is defined in part by reference to dispensing station 70, which is located at a first position along the closed path of receptacles 45.

The first steps are illustrated in FIG. 4A. At a position before dispensing station 70 base mold member 46 is manually placed within receptacle 45c. Mold members 46 and 47 are treated with a release agent such as a mixture of lecithin and starch polymer. A wide variety of release agents are commercially available; however, it is necessary to determine the phytotoxicity of any such agent before use. The release agent facilitates quick removal of residual flashing.

In FIG. 4B mold receptacle 45c has moved to dispensing station 70. The soil-resin mixture 50 is dispensed continuously onto the horizontally extending base mold member 46a set within the mold receptacle. When base mold member 46a is almost completely covered with a layer of soil-resin mixture, microswitch 73 is tripped by arm 53 supporting the next approaching receptacle 45. In response, arm 68 extends so as to position outlet 67 over corner 72 as the mold receptacles pass thereunder.

In FIG. 4C worker 95 is manually setting tray mold member 47a upon the layer of soil-resin mixture within mold receptacle 45c. The step illustrated in FIG. 4C is performed at a second position along the path of mold receptacles 45 which is located after dispensing station 70, yet before the position along the path at which the soil-resin mixture starts to exhibit any noticeable expansion. For a typical soil-resin mixture as used with the illustrated embodiment of the apparatus, the first position, at which the mixture is dispensed and the second position, at which tray mold 47 is set in place, are typically separated by about 25° of arc. The precise angle, of course, depends upon the particular pre-polymer compound and the temperature of the mixture; it is readily determined by observation of the point at which the mixture noticeably starts to expand.

In FIG. 4D bias means 57 is actuated to urge the tray and base mold members together to extrude soil-resin mixture therebetween into the plug-molding cavities of the tray mold member. In the illustrated embodiment bias means 57 is manually actuated by lever 98 controlling pneumatic cylinder 58.

It is important that base and tray mold members 46 and 47 be urged substantially flush against one another. Only in this way will all the seed cavities molded by the array of protruding members 48 of base mold member 46 have a standard size, and only in this way will a controlled quantity of mixture 50 be introduced into the plug-molding cavities. The amount of mixture extruded into the cavities depends on the thickness of the layer introduced at dispensing station 70. The layer must be sufficiently thick to assure that the quantity of mixture in the cavities will swell to completely fill and slightly overflow the cavities. If a lesser quantity is introduced into the cavities, then the finished plugs will not fully conform to the length and shape of the cavities. The resulting misshapen plugs tend to be meshed when they are transferred from the trays by automated transplanting machinery. The surplus mixture expanding beyond the cavities, when a layer of proper thickness is dispensed, can be seen at 92 in FIG. 4D. This surplus will form a layer of flashing as the mixture cures, which can easily be scraped off.

After the tray and base mold members are urged together and the mixture is forced into the plug-holding cavities, the tray and base mold members are clamped together to maintain them in this configuration as the mixture cures. It is important that the tray and base mold members be clamped as or slightly before the mixture starts to blow. In apparatus constructed according to the present invention, proper timing of the clamping step is assured by initiating it at a predetermined third position along the closed path of receptacles 45. For a typical soil-resin mixture as used with the present apparatus, the third position will be separated from dispensing station 70 located at the first position by about 30° to 45° of arc. The mold members are then maintained in curing configuration until a fourth position along the closed path. The fourth position is chosen to assure that the mixture will sufficiently cure before the clamp is released and is found typically to have an angular separation of at least 240° of arc from the third position at which the mold members are clamped.

Between the fourth position and dispensing station 70 at the first position, bias means 57 is released. FIG. 4E shows worker 96 operating lever 98 to release the bias means and preparing to scrape the cured flashing from the exposed surface of tray mold member 47a with blade 97. After worker 96 scrapes off the flashing, he operates lever 99 to actuate pneumatic cylinders 85, which eject the base and tray mold members from mold receptacle 45.

FIG. 4F shows worker 96 preparing to peel the base mold member from the underside of tray mold member 47a. Separation of the two mold members is made easier if the base and tray mold members are initially coated with a release agent, as explained above, before they come in contact with the soil-resin mixture. Thus, after a base mold member is separated from a tray mold member with its full complement of soil plugs, the base member is washed and dipped in release agent in preparation for its subsequent use. The tray member loaded with plugs is sent on for subsequent disposition.

After separating the base and tray mold members, worker 96 places a new base mold member therein in start of the next round.

Mold receptacles 45 are formed with slotted bottoms, so that any mixture or flashing will not accumulate in the mold receptacle, but fall through instead. Accumulations of cured mixture in a mold receptacle interfere with the placement of the base and tray mold members, leading to improperly formed plugs or slowing down of operations. If the mold receptacle is constructed with a solid bottom, the accumulations cannot always be cleaned out in the time alloted at the apparatus's optimal running rate. Of course, any form of perforated receptacle bottom, whether slotted, wire mesh or otherwise, will suffice, and all such forms are understood herein by the term "slotted bottom."

The tray mold member will generally carry some flashing of soil-resin mixture on its underside, which is exposed only after the base mold member is removed. This flashing can be scraped off easily in the same manner as the flashing in FIG. 4E. However, it is found that bits of flashing tend to lodge in the seed cavities of the molded plugs and hinder the subsequent seeding operations. Sometimes the flashing will block a seed cavity completely. Some automatic seeding devices will not operate properly under these circumstances. Sometimes a bit of flashing will only partially obstruct a seed cavity, thereby effectively changing the dimensions of the seed cavity with resulting changes in the maturation of a seedling started therein. Therefore, when trays of soil plugs are prepared with the apparatus of the present invention, it can be advantageous to seed them before the excess flashing around the seed cavities is scraped off.

While the above provides a full and complete description of the preferred embodiments of the present invention, various modifications, alternate constructions and equivalents may be employed without departing from the spirit and scope of the invention disclosed herein and defined by the appended claims.

What is claimed is:

1. In the method of forming soil plugs within carrying trays comprising the steps of introducing a soil-water-resistive expandable prepolymer resin mixture into a mold receptacle onto a base mold member therein, positioning thereon a tray mold member having an array of plug-molding cavities, urging the tray and base mold members together to squeeze soil-water-reactive expandable prepolymer resin mixture therebetween into the plug-molding cavities, and clamping the tray and base mold members together while the soil-resin mixture cures, the improved method of the continuously forming highly regular and homogeneous soil plugs comprising the steps of:

continuously bringing the water-reactive expandable pre-polymer resin compound into initial reactive contact with a water-containing soil slurry;

mixing said pre-polymer compound and soil slurry and continuously dispensing the resulting mixture into mold receptacles in a time span short compared with the primary reaction time of the soil slurry and the pre-polymer compound;

continuously dispensing the resulting mixtures seriatim into said mold receptacles to form an approximately uniform layer covering the base mold members therein;

positioning a tray mold member within a receptacle upon said approximately uniform layer before the layer noticably expands; and performing the step of urging the tray and base mold members together to squeeze the soil-water-resistive expandable prepolymer resin mixture therebetween into the plug-molding cavities before the layer noticably expands.

2. The method of claim 1, further comprising the step of regulating the temperatures of said pre-resin compound and said soil slurry as they are continuously brought into reactive contact.

3. The method of claim 1, wherein a plurality of mold receptacles are mounted in a circle on a carrousel support means, and wherein said dispensing step is performed at a first position on said circle, said positioning step is performed at a second position, and said clamping step is performed along said circle from a third to a fourth position, and said carrousel support means is rotated about the center of said circle at a predetermined rate sufficiently fast that the soil-resin mixture will not noticeably expand between said first and second positions and sufficiently slow that the mixture will fully cure between said third and fourth positions.

4. The method of claim 3, wherein said first and third positions have an angular separation of about 30° to 45° and said third and fourth positions have an angular separation of at least 240°.

5. A method of seeding a tray of elastomeric soil plugs molded in said tray with flashing of elastomeric material from the molding process remaining on a tray surface, wherein said soil plugs have seed cavities opening on said tray surface, said method comprising the serial steps of:

mechanically inserting seeds into said seed cavities; and scraping said flashing from said tray surface.

6. Soil plug forming apparatus for use with a tray mold member having an array of plug-molding cavities therein and a base mold member having an array of protruding members registering with the array of plug-molding cavities, said apparatus comprising:

first means for mixing a soil slurry with a prepolymer compound;

second means for supplying soil slurry to said first means at a controlled rate;

third means for supplying pre-polymer compound to said first means at a controlled rate;

fourth means for delivering the mixed soil slurry and pre-polymer compound from said first means to a dispensing station;

a plurality of mold receptacles, each adapted to hold a base mold member and tray mold member with the protruding members and plug-molding cavities in alignment with one another, said plurality of mold receptacles being disposed along a closed path;

transport means operable to transport said mold receptacles about said closed path and seriatim past said dispensing station for dispensing of said mixture into the mold receptacles and onto base mold members situated therein; and releasable bias means proximate each of said mold receptacles and transportable therewith by said transport means for biasing a tray mold member against a base mold member within each of said mold receptacles with sufficient force to press the tray and base mold members substantially flush against one another thereby to extrude the mixture into said plug-molding cavities for forming soil plugs upon curing.

7. The apparatus of claim 6, wherein said bias means includes locking means to prevent the biased tray and base mold members within mold receptacles from parting as mixture contained therebetween expands.

8. The apparatus of claim 7, wherein said bias and locking means comprises a cam-over-center press.

9. The apparatus of claim 6, wherein said bias means includes spaced-apart members formed and positioned to engage a tray mold member positioned within a mold receptacle without blocking any of the plug-molding cavities in the tray mold member.

10. The apparatus of claim 6, wherein said mold receptacles are dimensioned for snug receipt of the tray and base mold members.

11. The apparatus of claim 6, wherein said mold receptacles are formed with slotted bottoms.

12. The apparatus of claim 6, wherein said transport means comprises carrousel means formed to support said mold receptacles along a circular path and mounted for rotation about the center of said circular path.

13. The apparatus of claim 6, wherein said fourth means includes a dispensing outlet mounted for reciprocation over said closed path and transverse thereto at said dispensing station for introducing the mixture into said mold receptacles in a succession of coalescing rows as said mold receptacles pass said dispensing station.

14. The apparatus of claim 13, further comprising synchronization means for positioning said dispensing outlet over a first mold receptacle at the point of shortest separation between said first receptacle and the next following receptacle synchronously with the departure of said first receptacle from said dispensing station.

15. The apparatus of claim 6, wherein said fourth means includes a dispensing nozzle mounted over said closed path at said dispensing station for spraying said mixture into said mold receptacles.

16. The apparatus of claim 15, further comprising means for accelerating said dispensing nozzle across the gap between a first mold receptacle and the next following mold receptacle as said first receptacle departs from said dispensing station.

17. The apparatus of claim 15, wherein said first means is mounted at said dispensing station.

18. The apparatus of claim 6 wherein said apparatus is used with a reservoir for holding the pre-polymer compound, said apparatus further comprising heating means adapted to be applied to said reservoir for maintaining the pre-polymer compound at a predetermined temperature.

19. The apparatus of claim 18, further comprising means for monitoring the temperatures of the soil slurry and of the pre-polymer compound being supplied to said first means.

20. The apparatus of claim 6, further comprising a reservoir connected to said third means for holding the pre-polymer compound, and desiccator means coupled to said third means and said reservoir for preventing moisture contamination of the pre-polymer compound.

21. The apparatus of claim 6, further comprising means structured and positioned for ejecting the tray and base mold members from the receptacles after curing of the soil plugs.

22. The apparatus of claim 6, further comprising a pair of concentric conduits, the outer conduit of said pair being connected to said second means and the inner conduit of said pair being connected to said third means, and said conduits being mounted with their discharge ends substantially even with one another, thereby to deliver soil slurry and pre-polymer compound to said first means in intimate proximity to one another.

23. Apparatus for continuously forming polymerized soil plugs from a soil-resin mixture comprising:
    means defining a mixing chamber;
    agitation means mounted within said mixing chamber;
    first means for continuously delivering a water-containing soil slurry to said mixing chamber at a controlled rate;
    second means for continuously delivering a water-reactive pre-polymer compound to said mixing chamber at a controlled rate;
    wherein all of said means co-function to mix the soil slurry and pre-polymer compound and to pass the resulting mixture from said mixing chamber continuously in a time span short compared with the primary reaction time of the pre-polymer compound and soil slurry; and
    means communicating with said mixing chamber for delivering the resulting mixture to soil plug molding means.

24. The apparatus of claim 23, further comprising a pair of concentric conduits, the outer conduit of said pair being connected to said first means and the inner conduit of said pair being connected to said second means, and said conduits being mounted on said means defining the mixing chamber to discharge soil slurry and pre-polymer compound into said chamber in intimate proximity to another another.

25. The apparatus of claim 23, further comprising desiccator means coupled to said second means for preventing moisture contamination and premature reaction of the prepolymer compound.

26. The apparatus of claim 23, further comprising heating means for maintaining the pre-polymer compound and soil slurry at predetermined temperatures for controlling the primary reaction time.

27. Apparatus for continuously forming polymerized soil plugs within molding-carrying trays having arrays of plug mold cavities therein, said apparatus comprising:
    a plurality of receptacles, each having a horizontally extending member registering with a surface of a molding-carrying tray;
    first means for continuously introducing soil-resin mixture onto the horizontally extending member within each receptacle in an approximately uniform layer; and
    bias means for urging a molding-carrying tray, positioned on said layer, against said horizontally extending member to extrude the soil-resin mixture uniformly into all the plug mold cavities of the array in said tray.

28. The apparatus of claim 27, further comprising means for moving said receptacles past a dispensing station; and said first means including a dispensing outlet mounted at said dispensing station for reciprocation over said receptacles transverse to the direction of movement thereof for introducing the mixture in a succession of coalescing rows to form said layer.

29. The apparatus of claim 28, further comprising synchronization means for positioning said dispensing outlet over a first receptacle at the point of shortest separation between said first receptacle and the next following receptacle synchronously with the departure of said first receptacle from said dispensing station.

30. The apparatus of claim 27, wherein said first means includes a dispensing nozzle mounted over said receptacles for spraying the mixture uniformly onto said horizontally extending member.

31. The apparatus of claim 27, further comprising means for moving said receptacles past a dispensing station; and means for accelerating said dispensing nozzle from a position over a first receptacle to the next following receptacle as said first receptacle departs from said dispensing station.

32. Apparatus for continuously forming soil plugs within mold members comprising:

a plurality of receptacles for receiving mold members, said receptacles being mounted on support means to form a circle;

means for introducing a soil-resin mixture into the receptacles at a first position on said circle;

means for securing the mold members within the receptacles in curing configuration at a second position on said circle and maintaining said mold members and receptacle in said curing configuration along said circle to a third position; and means for rotating said support means at a predetermined rate about the center of said circle wherein said rate and the location of said first, second, and third positions are chosen so that a receptacle is carried from said first position to said second position before soil-resin mixture introduced therein noticeably expands and from said second position to said third position in a sufficiently long time to allow the mixture introduced therein to cure.

33. The apparatus of claim 32 for use with a base mold member having a first array of protruding members and a tray mold member having a second array of plug-molding cavities registering with said first array, wherein said means for securing and maintaining in curing configuration comprises releasable bias means for urging a tray mold member against a base mold member within a receptacle with sufficient force to extrude into said cavities soil-resin mixture introduced therebetween at said first position.

34. The apparatus of claim 33, wherein said bias means includes locking means to prevent the biased tray and base mold members from parting as mixture contained therebetween expands.

35. The apparatus of clim 34, wherein said bias and locking means comprises a cam-over-center press.

36. The apparatus of claim 32, further comprising means for ejecting the mold members from the receptacles after said third position.

* * * * *